United States Patent
Ramgopal et al.

(10) Patent No.: US 11,816,087 B2
(45) Date of Patent: Nov. 14, 2023

(54) METHOD AND SYSTEM FOR BLOCKCHAIN MONITORING

(71) Applicant: Tata Consultancy Services Limited, Mumbai (IN)

(72) Inventors: Vivekanand Ramgopal, Chennai (IN); Malini Raman, Chennai (IN); Ashok Seshadri, Chennai (IN); Santhana Krishnan Trichy Nallusamy, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/812,140

(22) Filed: Jul. 12, 2022

(65) Prior Publication Data

US 2023/0075239 A1 Mar. 9, 2023

(30) Foreign Application Priority Data

Jul. 13, 2021 (IN) .............................. 202121031497

(51) Int. Cl.
*G06F 16/23* (2019.01)
*G06F 16/22* (2019.01)

(52) U.S. Cl.
CPC ...... *G06F 16/2308* (2019.01); *G06F 16/2282* (2019.01); *G06F 16/2358* (2019.01); *G06F 16/2365* (2019.01)

(58) Field of Classification Search
CPC ..... H04L 9/50; H04L 9/3239; H04L 63/1425; G06F 16/2308; G06F 16/2365; G06F 16/2358; G06F 16/2282
See application file for complete search history.

(56) References Cited

U.S. PATENT DOCUMENTS

| | | | | |
|---|---|---|---|---|
| 11,169,976 | B2* | 11/2021 | Danda | G06F 16/23 |
| 11,487,777 | B1* | 11/2022 | Bose | G06F 16/214 |
| 2017/0046651 | A1 | 2/2017 | Lin et al. | |
| 2017/0046693 | A1 | 2/2017 | Haldenby et al. | |
| 2019/0073215 | A1* | 3/2019 | Garay | G06F 8/658 |
| 2019/0228019 | A1* | 7/2019 | Madisetti | H04L 9/0637 |
| 2020/0092383 | A1* | 3/2020 | Clawsie | G06Q 30/00 |
| 2021/0142259 | A1* | 5/2021 | Kalia | G06Q 10/063112 |
| 2022/0318122 | A1* | 10/2022 | Hughes | H04L 9/0643 |

* cited by examiner

*Primary Examiner* — Etienne P Leroux
(74) *Attorney, Agent, or Firm* — Finnegan, Henderson, Farabow, Garrett & Dunner, LLP (57) ABSTRACT

Traditional blockchain monitoring systems have the disadvantage that they are capable of monitoring only a single blockchain ecosystem, as data from different blockchain networks running on different blockchain ecosystems may be heterogeneous in nature and poses associated data processing and interpretation challenges. The disclosure herein generally relates to blockchain monitoring, and, more particularly, to a method and system for monitoring blockchain networks belonging to different blockchain ecosystems. The system transforms the heterogeneous data to a homogeneous format, and then processes the data to identify one or more events. The system then identifies an action to be triggered in response to a determined event, which is then triggered by the system.

6 Claims, 4 Drawing Sheets

METHOD AND SYSTEM FOR BLOCKCHAIN MONITORING

PRIORITY CLAIM

This U.S. patent application claims priority under 35 U.S.C. § 119 to: Indian Patent Application No. 202121031497, filed on Jul. 13, 2021. The entire contents of the aforementioned application are incorporated herein by reference.

TECHNICAL FIELD

The disclosure herein generally relates to blockchain monitoring, and, more particularly, to a method and system for monitoring blockchain networks that are hosted on different underlying platforms.

BACKGROUND

Blockchain technology offers immutability, trust and transparency in addition to high data security and visibility, and for the same reason they are now being employed in a variety of applications across different industry segments such as banking, and insurance, for the purpose of storing data, allowing ecosystem participants in accessing the data on a real time basis as well as ensure automation of key business processes using Smart contracts. As the blockchain networks are being deployed to process/handle such important information and transaction flows, it is important to have systems that can monitor business processes being performed on the various blockchain networks.

Existing blockchain monitoring systems have the disadvantage that they are capable of monitoring only a single blockchain ecosystem that is deployed on a specific underlying platform such as Hyperledger Fabric, R3 Corda, Ethereum etc. One of the reasons for this disadvantage is that these blockchain platforms typically have different characteristics in terms of type of data being handled, permissions needed, certificates, consensus protocols, standards (such as Token SDK for R3 Corda, ERC for Ethereum etc.) and so on.

SUMMARY

Embodiments of the present disclosure present technological improvements as solutions to one or more of the above-mentioned technical problems recognized by the inventors in conventional systems. For example, in one embodiment, a system for blockchain monitoring is provided. The system includes one or more hardware processors, an I/O interface, and a memory storing a plurality of instructions. The plurality of instructions when executed, cause the one or more hardware processors to initially establish connection with a plurality of blockchain networks, by communicatively coupling the system with each of the plurality of blockchain networks, wherein the plurality of blockchain networks belong to different blockchain ecosystems and are hosted on different underlying blockchain platforms. The system then monitors the plurality of blockchain networks. Monitoring each of the plurality of blockchain networks involves the following steps. By monitoring, the system obtains real-time values of one or more parameters associated with each of the plurality of blockchain networks, as input data, wherein the input data is heterogeneous data. The system then transforms the heterogeneous data to a homogeneous data. Transforming the heterogeneous data to the homogeneous data involves transforming the obtained real-time values of the one or more parameters associated with the plurality of blockchain networks to a pre-defined standard format. Further, by processing the real-time values of one or more parameters in the homogeneous data, the system determines occurrence of one or more events, with at least one of the plurality of blockchain networks, wherein each event represents a variation in one or more operational procedures of the at least one blockchain network in comparison with a corresponding baseline operation procedure. The system then identifies from a lookup table, an action to be triggered in response to the determined one or more events, wherein the action is one of a) triggering a corrective action on at least one other blockchain network from among the plurality of blockchain networks, b) terminating the corresponding process in at least one blockchain network in which the one or more events are detected, c) sending notifications to administrators, and d) continuing in current state. Further, the identified action is executed by the system if any action is identified.

In another aspect, a processor implemented method of blockchain monitoring is provided. In this method, initially a connection is established with a plurality of blockchain networks, by communicatively coupling the system with each of the plurality of blockchain networks via one or more hardware processors, wherein the plurality of blockchain networks belong to different blockchain ecosystems and are hosted on same or different underlying blockchain platforms. Further, the plurality of blockchain networks is monitored via the one or more hardware processors. Monitoring the plurality of blockchain networks involves the following steps. By monitoring, real-time values of one or more parameters associated with each of the plurality of blockchain networks are obtained as input data, wherein the input data is heterogeneous data. Further, the heterogeneous data is transformed to a homogeneous data, which involves transforming the obtained real-time values of the one or more parameters associated with the plurality of blockchain networks to a pre-defined standard format. Further, by processing the real-time values of one or more parameters in the homogeneous data, the one or more hardware processors determines occurrence of one or more events, with at least one of the plurality of blockchain networks, wherein each event represents a variation in one or more operational procedures of the at least one blockchain network in comparison with a corresponding baseline operation procedure. Further, an action to be triggered in response to the determined one or more events is identified from a lookup table, wherein the action is one of a) triggering a corrective action on at least one other blockchain network from among the plurality of blockchain networks, b) terminating the at least one blockchain network in which the one or more events are detected, c) sending notifications to administrators, and d) continuing in current state. The identified action is then executed, via the one or more hardware processors.

In yet another aspect, a non-transitory computer readable medium for blockchain monitoring is provided. The non-transitory computer readable medium includes a plurality of instructions, which when executed, cause one or more hardware processors to perform the blockchain monitoring involving the following steps. Initially a connection is established with a plurality of blockchain networks, by communicatively coupling the system with each of the plurality of blockchain networks via one or more hardware processors, wherein the plurality of blockchain networks belong to different blockchain ecosystems and are hosted on different underlying blockchain platforms. Further, the plurality of blockchain networks are monitored via the one or more hardware processors. Monitoring the plurality of blockchain networks involves the following steps. By monitoring, real-time values of one or more parameters associated with each of the plurality of blockchain networks are obtained as input data, wherein the input data is heterogeneous data. Further, the heterogeneous data is transformed to a homogeneous data, which involves transforming the obtained real-time values of the one or more parameters associated with the plurality of blockchain networks to a pre-defined standard format. Further, by processing the real-time values of one or more parameters in the homogeneous data, the one or more hardware processors determines occurrence of one or more events, with at least one of the plurality of blockchain networks, wherein each event represents a variation in one or more operational procedures of the at least one blockchain network in comparison with a corresponding baseline operation procedure. Further, an action to be triggered in response to the determined one or more events is identified, from a lookup table, wherein the action is one of a) triggering a corrective action on at least one other blockchain network from among the plurality of blockchain networks, b) terminating the corresponding process in at least one blockchain network in which the one or more events are detected, c) sending notifications to administrators, and d) continuing in current state. The identified action is then executed, via the one or more hardware processors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Figure 1:
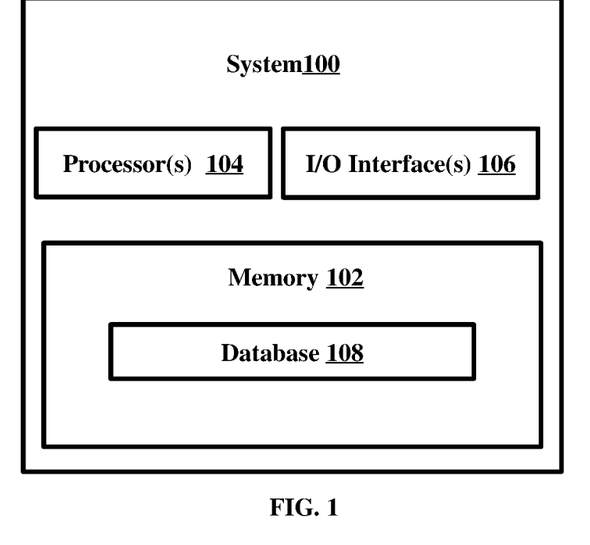
FIG. 1 illustrates an exemplary system for blockchain monitoring, according to some embodiments of the present disclosure.
Figure 2A:
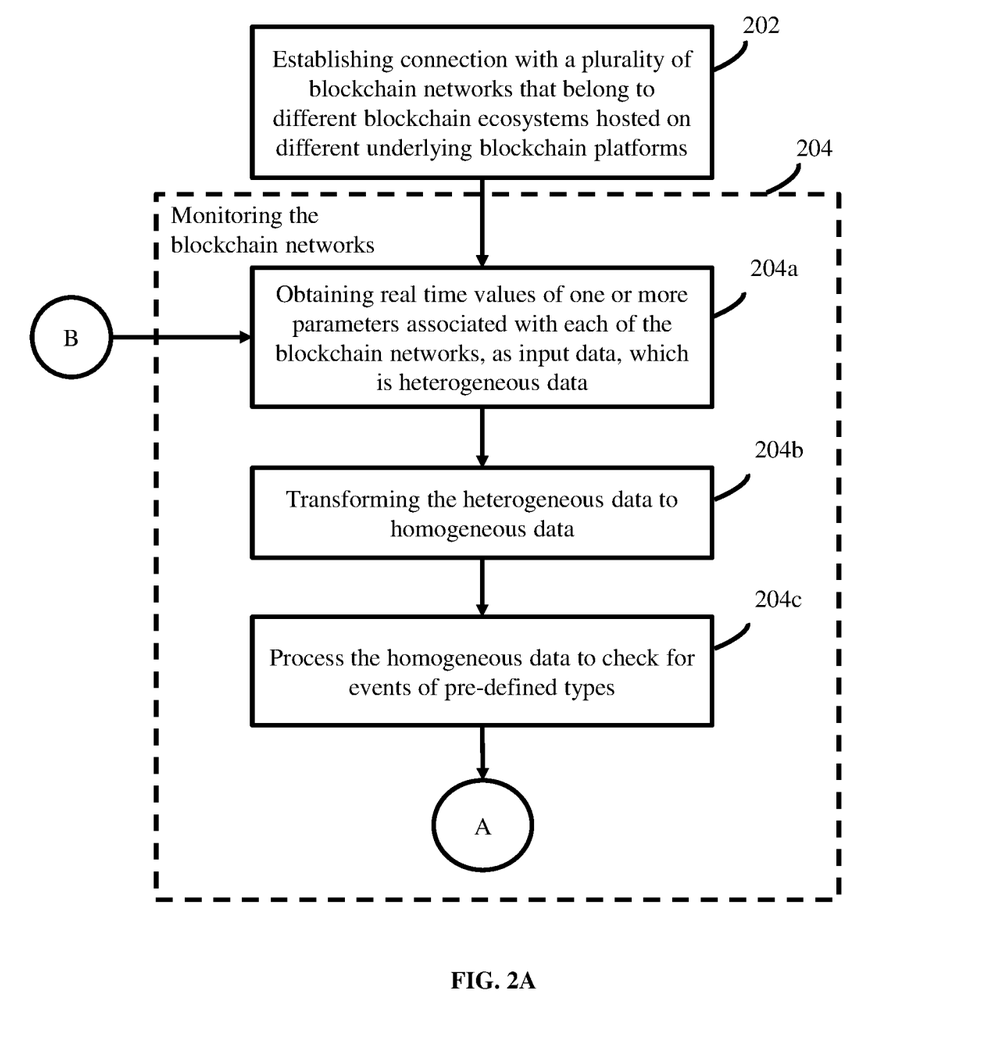
FIGS. 2A and 2B (collectively referred to as FIG. 2), is a flow diagram depicting steps involved in the process of the blockchain monitoring performed by the system of FIG. 1, according to some embodiments of the present disclosure.
Figure 2B:
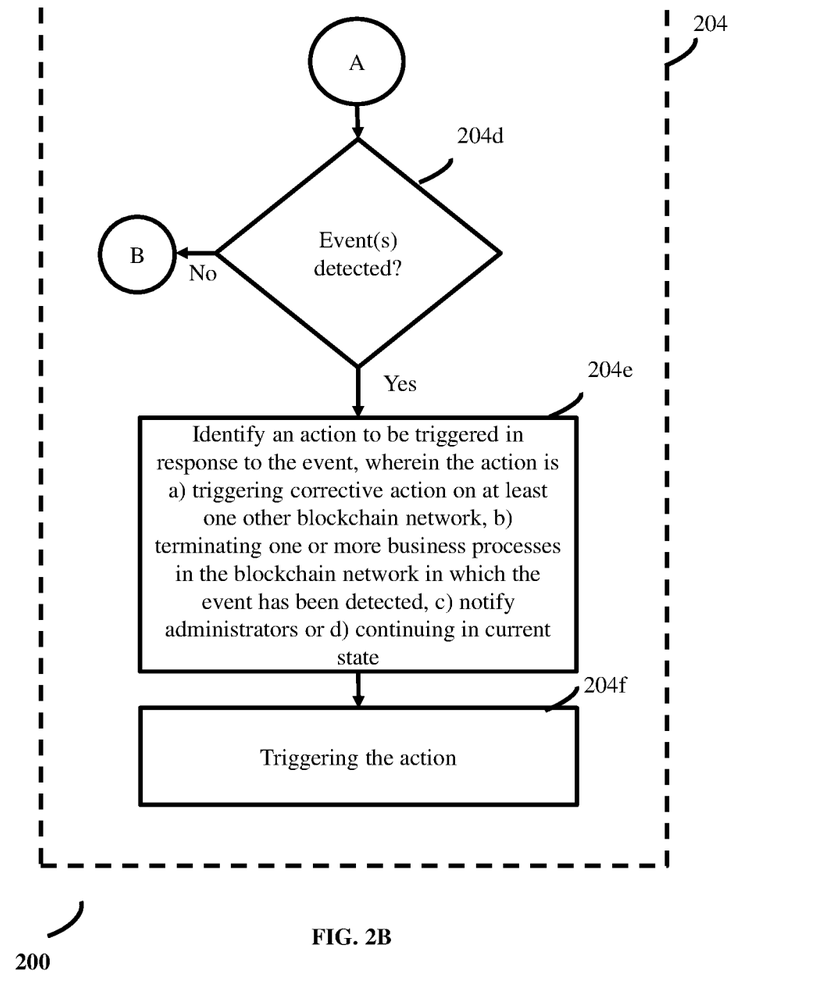
Figure 3:
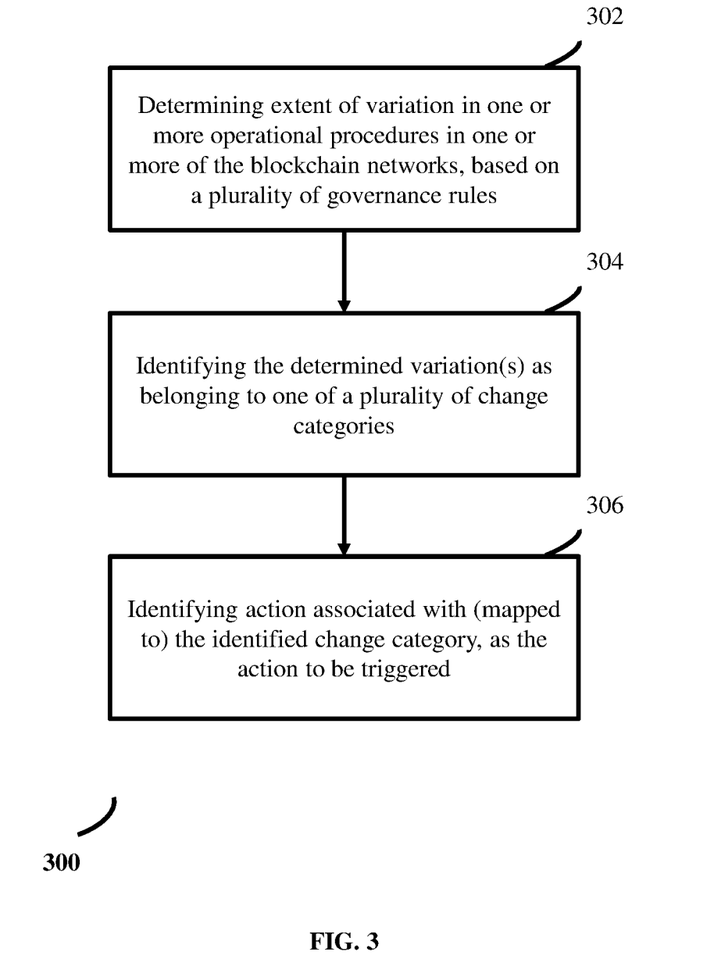
FIG. 3 is a flow diagram depicting steps involved in the process of identifying action to be triggered in response to a determined event, by the system of FIG. 1, in accordance with some embodiments of the present disclosure.

Referring now to the drawings, and more particularly to FIG. 1 through FIG. 3, where similar reference characters denote corresponding features consistently throughout the figures, there are shown preferred embodiments and these embodiments are described in the context of the following exemplary system and/or method.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores all data associated with the blockchain network monitoring being performed by the system 100. For example, definition of different events, conditions (in terms values of specific parameters) defining occurrence of each of the events, information on different categories of variations, action(s) associated with each category, a lookup table storing mapping of each of a plurality of pre-defined events with corresponding at least one action, and mapping between the plurality of blockchain networks, and so on are stored in the database 108. In addition to this, a plurality of executable instructions (which form the non-transitory computer readable medium) also are stored in the database 108. Also, information on data collected during the monitoring of the blockchain networks, events detected, actions triggered, and so on, also are stored in the database 108, as required. This data may act as historical data at later instance of time. Functions of the components of the system 100 are explained in conjunction with FIG. 2 and FIG. 3.

FIGS. 2A and 2B (collectively referred to as FIG. 2), is a flow diagram depicting steps involved in the process of the blockchain monitoring performed by the system of FIG. 1, according to some embodiments of the present disclosure. The system 100 is used to monitor blockchain networks that belong to different blockchain ecosystems and are hosted on different underlying blockchain platforms. For example, some of the blockchain networks being monitored may be handling data from banking domain, whereas some other blockchain networks may be handling data related to insurance domain, and so on. The term 'blockchain ecosystems' refer to the set of nodes connected together for a specific application as listed above, whereas the 'underlying blockchain platforms' may refer to different types of blockchains being used, for example, Hyperledger® Fabric, Ethereum®, Corda®, Quorum® and so on.

At step 202, the system 100 establishes connection with the plurality of blockchain networks to be monitored, by communicatively coupling the system 100 with each of the plurality of blockchain networks. The system 100 may use appropriate interfaces with suitable communication protocols, as provided by the I/O interface 106, to establish connection with each of the blockchain networks. Further, at step 204, the system 100 monitors the blockchain networks. The monitoring of the blockchain networks involves the following steps.

At step 204a, the system obtains real time values of one or more parameters associated with each of the blockchain networks, as input data. As the blockchain networks belong to different blockchain ecosystems and may be hosted on different underlying blockchain platforms, the input data being collected is heterogeneous in nature. The parameters obtained may be specific to the type of application each blockchain network is deployed in. For example, the data obtained from the blockchain network deployed in the banking domain may include selected customer identification details, customer transaction details, credit card payment history/pattern, credit score, whether any loan is availed, loan repayment history and so on. Similarly, the data obtained from the blockchain network deployed in the insurance domain may include information such as but not limited to premium payment history, claims history of each customer and so on. In these examples, some of the information such as the user identification data may be static (non-real-time), and may be collected and stored during an initial configuration, and then the real-time data such as transaction details may be collected in real-time.

To process the data further, at step 204b, the system 100 transforms/converts the heterogeneous input data to a homogeneous data. This step involves transforming the obtained real-time values of the one or more parameters associated with the plurality of blockchain networks to a pre-defined standard format. The different blockchain networks being monitored belong to different blockchain ecosystems being hosted on different underlying blockchain platforms. For the same reason, each of the blockchain networks may have own characteristics. For example, the terms/notations used may be unique to each and because each blockchain network. In another example, the data type/format may be different for different blockchain networks. Due to such differences, the collected input data is of heterogeneous nature. To further process the input data to execute steps that are part of the monitoring process, the heterogeneous input data is transformed to a pre-defined common format i.e. to a homogeneous format. In an embodiment, the system 100 may use any suitable data processing technique/algorithm to process and convert the heterogeneous input data to the homogeneous data. For example, a Variational Auto Encoder (VAE) based method may be used for converting the heterogeneous data to the homogeneous data.

Further, at step 204c, the system 100 processes the homogeneous data, and checks for occurrence of one or more events of pre-defined types. For example, the user continuously failing to pay loan EMIs on time for a particular duration (for example, 3 consecutive months) may be considered as an event. Similarly, any fraudulent transaction marked as being made or attempted by any user may be considered as an event. Different types of such events, and conditions (in terms of values of different parameters or combination of parameters) that define occurrence of each event may be defined and stored in the database 108. In various embodiments, there may be generic/common events and application-specific events defined. The system 100 is configured to process the input data and identify occurrence of any of the pre-defined events. By definition, each event indicates/represents a variation in one or more operational procedures of any of the blockchain networks being monitored, in comparison with a corresponding baseline operation procedure. For example, in the aforementioned banking scenario, the user not defaulting payment is an ideal/baseline operation procedure.

Upon detecting any of the events, at step 204e, the system 100 identifies an action to be triggered in response to the detected event, from a lookup table. Steps involved in the process of identifying the action are depicted in method 300 in FIG. 3. At step 302, the system 100 determines an extent of variation in one or more operational procedures in one or more of the blockchain networks, based on a plurality of governance rules, and then at step 304, categorizes the determined variation(s) as belonging to specific categories. For example, the categories may be 'mild, medium, and extreme'. The governance rules help the system 100 to interpret and categorize the variations as belonging to specific class. For example, one of the governance rules may state that the user defaulting payment once in an year may be considered as an event that belongs to the 'mild' category, whereas another governance rule may state that the user defaulting payment twice in an year may be considered as an event that belongs to the 'medium' category, and a third governance rule may state that the user defaulting payment for more than 3 times in an year may be considered as an event that belongs to the 'extreme' category. Additional examples of the governance rules are given in Table. 1 (also referred to as 'lookup table').

TABLE 1

Governance rules

| Source Blockchain identifier | Source Smart contract/ Function | Assessment parameter | Rule ID | Assessment Level | Rule | RAG Level | Action type |
|---|---|---|---|---|---|---|---|
| Crypto Services | Bitcoin Forensics | Forensic check response | RULE_0001 | Level 1 | If response == OK | Green | No Action |
| Crypto Services | Bitcoin Forensics | Forensic check response | RULE_0002 | Level 2 | If response == NOK && blacklist level === 3 | Amber | Ledger update |
| Crypto Services | Bitcoin Forensics | Forensic check response | RULE_0003 | Level 3 | If response == NOK && blacklist level === 2 | Red | Ledger update |
| Crypto Services | Bitcoin Forensics | Forensic check response | RULE_0004 | Level 4 | If response == NOK && blacklist level === 1 | Amber | Ledger update |
| Crypto Services | Bitcoin Forensics | Forensic check response | RULE_0005 | Level 5 | If response == NOK && blacklist level == 3 && frequency of transaction > 1 | Amber | Alert |
| Crypto services | Query account balance | Blank search | RULE_0006 | Level 1 | — | Amber | Alert |
| Crypto services | Query account balance | Transaction frequency | RULE_0007 | Level 1 | Txn count per user > 3 per minute | Amber | Alert |
| Crypto services | Query account balance | Transaction frequency | RULE_0008 | Level 2 | Txn count per user > 60 per minute | Red | Ledger update |
| Crypto services | Query account balance | Transaction frequency | RULE_0009 | Level 3 | Txn count per user > 60 per minute | Red | Alert |

As in Table. 1, different governance rules may be defined and configured with the system 100, wherein each governance rule may be used to monitor different parameters (for example, RULE_0007 monitors transaction frequency), and based on pre-determined severity/importance of the parameters being monitored, each governance rule may be determined as being associated with a specific assessment level (for example, RULE_0007 is level 1). Also, appropriate actions are defined and are associated with each governance rule, such that when an event is detected by any of the governance rules, corresponding action is selected as the action to be triggered, at step 306.

Further, at step 306, the system 100 identifies an action associated with/mapped to the identified change category, as an action to be triggered. The action may be at least one of a) triggering corrective action on at least one other blockchain network, b) terminating one or more process(es) in the blockchain network in which the event has been detected, c) sending notifications to administrators, or d) continuing in current state.

The step of triggering the corrective action on at least one other blockchain network may be further explained with the following example. Consider that the system 100 is monitoring three blockchain networks X, Y, and Z, where X being the blockchain network in the banking domain and associated with a first bank, Y being in the insurance domain, and Z being associated with a second bank. By processing data from X, using the aforementioned steps, the system 100 determines an event in the extreme category for a user. This in turn may indicate that the user is not a reliable customer. The user may attempt to take a policy from the insurance company (Y) or a loan from the second bank (Z), however, considering the loan repayment history of the user, sanctioning a loan for the user may be a risk. In this example, the action that is associated with the extreme category may be blacklisting the user in a database which multiple financial institutions may be sharing, and at step 204f the system 100 triggers the identified action and blacklists the user in the database.

In similar manner appropriate actions may be associated with each category, which the system 100 executes accordingly. Information on mapping of each of a plurality of pre-defined events with corresponding at least one action, and mapping between the plurality of blockchain networks may be stored in a lookup table in the database 108. To determine the action to be triggered, the system 100 may compare the detected event with the data in the lookup table. Information on the mapping between the plurality of blockchain networks helps the system 100 determine the blockchain networks on which the corrective action is to be executed. For example, in the aforementioned scenario of the system 100 monitoring the three blockchain networks X, Y, and Z, if the mapping indicates that in response to an event detected in X the corrective action is to be executed only on Z, the system 100 executes the corrective action only in Z and not in Y.

Similarly, consider that the event detected is one or more bank accounts being hacked and fraudulent transactions being performed. As such an event may lead to customers losing money from their accounts, the system 100 may terminate the corresponding process(es) on the blockchain network in which the event has been detected. This is referred to as action b. In an embodiment, the processes being terminated are business processes (for example, banking related, insurance related and so on), subject to domain/ application in which the blockchain network is being used. It is to be noted that the aforementioned bank account hacking related application is used only an example, and the system 100 may be configured to identify similar events and trigger blocking of business processes in the corresponding blockchain networks in other applications as well.

Alternatively, the system 100 could send notifications to administrators indicating the type of event detected. The system 100 could be connected to an AI/ML module (not shown) which could assess a resolution provided by the administrator and use this information for determining possible actions if a similar event is encountered in future.

The fourth action that may be executed by the system 100 in response to detection of an event is continuing in current state. The idiom 'continuing in current state' may refer to a process of not triggering any specific action in response to the detected event. For example, certain events may be marked as having less severity and may be configured with the system 100 (such as the action marked against RULE_0001 in Table. 1). Upon detecting the event at step 204*d*, the system 100 may determine, based on pre-configured data (i.e. the governance rules), whether the detected event is one of the events that have been marked as having less severity, and if yes, then the system 100 decides to continue in the current state, without triggering any specific action in response to the detected event.

In various embodiments, the steps in method 200 may be performed in the same order as depicted in FIG. 2, or in any alternate order that is technically feasible. In another embodiment, one or more steps in method 200 may be omitted.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The system 100 supports simultaneous monitoring of multiple blockchain networks belong to different blockchain ecosystems and are hosted on different underlying blockchain platforms. The system 100 addresses compatibility issue in interacting with blockchain networks that belong to different blockchain ecosystems, by providing means for converting heterogeneous data received from the plurality of blockchain networks, to a standard data format (i.e. to a homogeneous format). The system 100 also facilitates determining and executing corrective action in one or more blockchain networks, in response to an event detected in at least one other blockchain network.

The embodiments of present disclosure herein address unresolved problem of monitoring of blockchain networks. The embodiment thus provides a mechanism for monitoring blockchain networks that belong to different blockchain ecosystems and are hosted on different underlying blockchain platforms. Moreover, the embodiments herein further provide a mechanism to identify and execute corrective actions in the same blockchain network in which an event is detected or in other blockchain networks that may be associated with the blockchain network in which an event is detected.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A system for blockchain monitoring, comprising:
one or more hardware processors;
an I/O interface; and
a memory storing a plurality of instructions, wherein the plurality of instructions when executed, cause the one or more hardware processors to:
establish connection with a plurality of blockchain networks, by communicatively coupling the system with each of the plurality of blockchain networks, wherein the plurality of blockchain networks belong to different blockchain ecosystems and are hosted on different underlying blockchain platforms; and
monitor the plurality of blockchain networks, wherein to monitor the plurality of blockchain networks, the one or more hardware processors are configured by the instructions to:
obtain real-time values of one or more parameters associated with each of the plurality of blockchain networks, as input data, wherein the input data is heterogeneous data;
transform the heterogeneous data to a homogeneous data, comprising transforming the obtained real-time values of the one or more parameters associated with the plurality of blockchain networks to a pre-defined standard format;
determine occurrence of one or more events with at least one of the plurality of blockchain networks, by processing the real-time values of one or more parameters in the homogeneous data, wherein each event represents a variation in one or more operational procedures of the at least one blockchain network in comparison with a corresponding baseline operation procedure;
identify from a lookup table, an action to be triggered in response to the determined one or more events, wherein the action is one of a) triggering a corrective action on at least one other blockchain network from among the plurality of blockchain networks, b) terminating one or more processes in at least one blockchain network in which the one or more events are detected, c) sending notifications to administrators, and d) continuing in current state, wherein identifying the at least one action to be triggered in the at least one other blockchain network comprises:
comparing the determined at least one event with the lookup table, wherein the lookup table comprises a) mapping of each of a plurality of pre-defined events with corresponding at least one action, and b) mapping between the plurality of blockchain networks; and
determining the at least one action to be triggered, based on the comparison of the determined at least one event with the lookup table; and
execute the identified action.

2. The system of claim 1, wherein one or more hardware processors are configured by the instructions to identify the action to be triggered, by:
determining an extent of variation in the one or more operational procedures, based on a plurality of pre-defined governance rules;
identifying the determined variation as belonging to one of a plurality of change categories; and
identifying an action mapped to the identified change category as the action to be triggered.

3. A processor implemented method of blockchain monitoring, comprising:
establish connection with a plurality of blockchain networks, by communicatively coupling the system with each of the plurality of blockchain networks, wherein the plurality of blockchain networks belong to different blockchain ecosystems and are hosted on different underlying blockchain platforms; and
monitor the plurality of blockchain networks, wherein to monitor the plurality of blockchain networks, the one or more hardware processors are configured by the instructions to:
obtain real-time values of one or more parameters associated with each of the plurality of blockchain networks, as input data, wherein the input data is heterogeneous data;
transform the heterogeneous data to a homogeneous data, comprising transforming the obtained real-time values of the one or more parameters associated with the plurality of blockchain networks to a pre-defined standard format;
determine occurrence of one or more events with at least one of the plurality of blockchain networks, by processing the real-time values of one or more parameters in the homogeneous data, wherein each event represents a variation in one or more operational procedures of the at least one blockchain network in comparison with a corresponding baseline operation procedure;
identify from a lookup table, an action to be triggered in response to the determined one or more events, wherein the action is one of a) triggering a corrective action on at least one other blockchain network from among the plurality of blockchain networks, b) terminating one or more processes in at least one blockchain network in which the one or more events are detected, c) sending notifications to administrators, and d) continuing in current state, wherein identifying the at least one action to be triggered in the at least one other blockchain network comprises:
comparing the determined at least one event with the lookup table, wherein the lookup table comprises a) mapping of each of a plurality of pre-defined events with corresponding at least one action, and b) mapping between the plurality of blockchain networks; and
determining the at least one action to be triggered, based on the comparison of the determined at least one event with the lookup table; and
execute the identified action.

4. The method of claim 3, wherein identifying the action to be triggered, comprises:
determining an extent of variation in the one or more operational procedures, based on a plurality of pre-defined governance rules;
identifying the determined variation as belonging to one of a plurality of change categories; and
identifying an action mapped to the identified change category as the action to be triggered.

5. One or more non-transitory machine-readable information storage mediums comprising one or more instructions which when executed by one or more hardware processors cause to:
establish connection with a plurality of blockchain networks, by communicatively coupling the system with each of the plurality of blockchain networks, wherein the plurality of blockchain networks belong to different blockchain ecosystems and are hosted on different underlying blockchain platforms; and monitor the plurality of blockchain networks, wherein to monitor the plurality of blockchain networks, the one or more hardware processors are configured by the instructions to:
  obtain real-time values of one or more parameters associated with each of the plurality of blockchain networks, as input data, wherein the input data is heterogeneous data;
  transform the heterogeneous data to a homogeneous data, comprising transforming the obtained real-time values of the one or more parameters associated with the plurality of blockchain networks to a pre-defined standard format;
  determine occurrence of one or more events with at least one of the plurality of blockchain networks, by processing the real-time values of one or more parameters in the homogeneous data, wherein each event represents a variation in one or more operational procedures of the at least one blockchain network in comparison with a corresponding baseline operation procedure;
  identify from a lookup table, an action to be triggered in response to the determined one or more events, wherein the action is one of a) triggering a corrective action on at least one other blockchain network from among the plurality of blockchain networks, b) terminating one or more processes in at least one blockchain network in which the one or more events are detected, c) sending notifications to administrators, and d) continuing in current state, wherein identifying the at least one action to be triggered in the at least one other blockchain network comprises:
    comparing the determined at least one event with the lookup table, wherein the lookup table comprises a) mapping of each of a plurality of pre-defined events with corresponding at least one action, and b) mapping between the plurality of blockchain networks; and
    determining the at least one action to be triggered, based on the comparison of the determined at least one event with the lookup table; and
  execute the identified action.

6. The one or more non-transitory machine-readable information storage mediums of claim 5, wherein identifying the action to be triggered, comprises:
  determining an extent of variation in the one or more operational procedures, based on a plurality of pre-defined governance rules;
  identifying the determined variation as belonging to one of a plurality of change categories; and
  identifying an action mapped to the identified change category as the action to be triggered.

* * * * *